United States Patent
Ostapenko

(10) Patent No.: US 11,059,421 B2
(45) Date of Patent: Jul. 13, 2021

(54) VEHICLE PROXIMITY SYSTEM USING HEADS-UP DISPLAY AUGMENTED REALITY GRAPHICS ELEMENTS

(71) Applicant: Honda Motor Co., Ltd., Tokyo (JP)

(72) Inventor: Maxim Ostapenko, Redondo Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 345 days.

(21) Appl. No.: 15/939,763

(22) Filed: Mar. 29, 2018

(65) Prior Publication Data
US 2019/0299855 A1 Oct. 3, 2019

(51) Int. Cl.
| | | |
|---|---|---|
| *B60Q 9/00* | (2006.01) | |
| *B60W 30/16* | (2020.01) | |
| *B60W 50/14* | (2020.01) | |
| *G08G 1/16* | (2006.01) | |
| *G06T 19/00* | (2011.01) | |
| *B60W 30/14* | (2006.01) | |
| *B60K 37/02* | (2006.01) | |

(52) U.S. Cl.
CPC .......... *B60Q 9/008* (2013.01); *B60W 30/143* (2013.01); *B60W 30/16* (2013.01); *B60W 50/14* (2013.01); *G06T 19/006* (2013.01); *G08G 1/166* (2013.01); *B60K 37/02* (2013.01); *B60K 2370/155* (2019.05); *B60K 2370/179* (2019.05); *B60K 2370/31* (2019.05); *B60K 2370/334* (2019.05); *B60K 2370/52* (2019.05); *B60W 2050/146* (2013.01); *B60W 2554/801* (2020.02); *B60W 2720/10* (2013.01); *B60W 2754/30* (2020.02)

(58) Field of Classification Search
CPC ..... B60Q 9/008; B60W 30/143; B60W 30/16; B60W 50/14; B60W 2754/30; B60W 2554/801; B60W 2050/146; B60W 2720/10; G06T 19/006; G08G 1/166; B60K 2370/31; B60K 2370/52; B60K 2370/155; B60K 2370/179; B60K 37/02
See application file for complete search history.

(56) References Cited

U.S. PATENT DOCUMENTS

| | | |
|---|---|---|
| 6,658,344 B2 | 12/2003 | Hirasago |
| 7,126,583 B1 | 10/2006 | Breed |
| 7,605,773 B2 | 10/2009 | Janssen |
| 7,734,419 B2 | 6/2010 | Kondoh |
| 8,269,652 B2 | 9/2012 | Seder et al. |
| 8,384,531 B2 | 2/2013 | Szczerba et al. |
| 8,384,532 B2 | 2/2013 | Szczerba et al. |

(Continued)

*Primary Examiner* — Redhwan K Mawari
(74) *Attorney, Agent, or Firm* — Rankin, Hill & Clark LLP

(57) ABSTRACT

The systems and methods disclosed herein are directed to a vehicle proximity system. The vehicle proximity system uses sensors, a vehicle computing device, and a heads-up display of a host vehicle to present proximity graphic elements to a vehicle occupant, such as the driver of the host vehicle. The proximity graphic elements are displayed using a heads-up display and are projected on a transparent surface of the host vehicle, such as the windows, windshield, display screen, lenses, etc. The proximity graphic elements indicate the presence of a proximal vehicle to the host vehicle. In some embodiments, the proximal vehicle is a vehicle passing the host vehicle. Alternatively, the proximal vehicle may be inline with the host vehicle traveling in a forward or rearward direction.

16 Claims, 9 Drawing Sheets

(56) References Cited

U.S. PATENT DOCUMENTS

| | | |
|---|---|---|
| 8,559,675 B2 | 10/2013 | Nogami et al. |
| 8,686,922 B2 | 4/2014 | Breed |
| 8,706,342 B1 | 4/2014 | Szybalski et al. |
| 8,781,170 B2 | 7/2014 | Mathieu et al. |
| 8,903,638 B2 | 12/2014 | Lin et al. |
| 9,008,369 B2 | 4/2015 | Schofield et al. |
| 9,135,825 B2 | 9/2015 | Nagata |
| 9,139,133 B2 | 9/2015 | Eng et al. |
| 9,168,869 B1 | 10/2015 | Kamal |
| 9,247,779 B1 | 2/2016 | Aloumanis et al. |
| 9,285,233 B2 | 3/2016 | Sugiyama et al. |
| 9,406,234 B2 | 8/2016 | Yellambalase et al. |
| 9,434,384 B2 | 9/2016 | Kim et al. |
| 9,469,248 B2 | 10/2016 | Ng-Thow-Hing et al. |
| 9,522,676 B2 | 12/2016 | Nespolo et al. |
| 9,586,525 B2 | 3/2017 | Sejalon et al. |
| 9,694,817 B2 | 7/2017 | Ann |
| 9,761,145 B2 | 9/2017 | Ejiri |
| 9,874,746 B2 | 1/2018 | Matsubara et al. |
| 9,881,502 B2 * | 1/2018 | Sangorrin ............. B60Q 9/005 |
| 9,947,226 B2 | 4/2018 | Lai et al. |
| 2009/0187343 A1 * | 7/2009 | Koch-Groeber ....... B60K 35/00 701/301 |
| 2011/0181728 A1 | 7/2011 | Tieman et al. |
| 2012/0200476 A1 | 8/2012 | Kanamori et al. |
| 2012/0224060 A1 | 9/2012 | Gurevich et al. |
| 2013/0041576 A1 * | 2/2013 | Switkes ................ G08G 1/167 701/123 |
| 2014/0019005 A1 * | 1/2014 | Lee ........................ G02B 27/01 701/36 |
| 2014/0268353 A1 | 9/2014 | Fujimura et al. |
| 2015/0291160 A1 * | 10/2015 | Kim ...................... B60W 30/16 345/633 |
| 2015/0331236 A1 | 11/2015 | Roth et al. |
| 2016/0125631 A1 | 5/2016 | Ham |
| 2016/0167514 A1 | 6/2016 | Nishizaki et al. |
| 2016/0170487 A1 | 6/2016 | Saisho |
| 2016/0200249 A1 | 7/2016 | Boyd et al. |
| 2016/0313562 A1 | 10/2016 | Saisho et al. |
| 2016/0379497 A1 * | 12/2016 | Hatakeyama ........... G08G 1/16 340/435 |
| 2017/0039856 A1 | 2/2017 | Park |
| 2017/0080952 A1 | 3/2017 | Gupta et al. |
| 2017/0101092 A1 | 4/2017 | Nguyen Van et al. |
| 2017/0161009 A1 * | 6/2017 | Ogisu ................... B60K 35/00 |
| 2017/0185853 A1 | 6/2017 | Yokota et al. |
| 2017/0213459 A1 * | 7/2017 | Ogaz ...................... G08G 1/166 |
| 2017/0232896 A1 | 8/2017 | Bassi et al. |
| 2017/0253181 A1 * | 9/2017 | Choi ...................... B60Q 9/008 |
| 2017/0261747 A1 | 9/2017 | Acklin |
| 2017/0276938 A1 * | 9/2017 | Nakashima ............. B60R 11/02 |
| 2017/0291545 A1 | 10/2017 | Lai et al. |
| 2017/0291547 A1 | 10/2017 | Lai et al. |
| 2017/0305418 A1 | 10/2017 | Bae |
| 2017/0355263 A1 | 12/2017 | Banvait et al. |
| 2018/0011314 A1 | 1/2018 | Quiroz de la Mora |
| 2018/0023970 A1 | 1/2018 | Iguchi |
| 2019/0291728 A1 * | 9/2019 | Shalev-Shwartz .......................... B60W 30/0953 |
| 2020/0039510 A1 * | 2/2020 | Kume .................... B60R 21/00 |

* cited by examiner

VEHICLE PROXIMITY SYSTEM USING HEADS-UP DISPLAY AUGMENTED REALITY GRAPHICS ELEMENTS

BACKGROUND

As cars accelerate, brake, and move around one another, it can be difficult for drivers to gauge the proximity of other vehicles as they are moving toward, away, and about one another. The inability to gauge the proximity of vehicles can be further exacerbated by road conditions that change the response of a vehicle to accelerating, breaking, and passing. Additionally, environmental conditions such as sun glare and fog that limit visibility, and driver in attention can also affect a driver's ability to gauge the proximity of other vehicles. Not being able to gauge the proximity of vehicles can pose a hazard to the driver, the driver's vehicle, as well as the other vehicles on the road.

BRIEF DESCRIPTION

According to one aspect, a vehicle proximity system includes at least one sensor arranged on a host vehicle. The at least one sensor is configured to calculate proximity measurements of a proximal vehicle. The vehicle proximity system also includes a proximal vehicle module configured to calculate proximal vehicle data based on the proximity measurements of the proximal vehicle. The vehicle proximity system further includes a host vehicle module configured to compare the proximal vehicle data to host vehicle data to determine relative motion data. The vehicle proximity system includes a proximity alert module configured to control a heads-up display device to present the relative motion data as augmented reality proximity graphics in view of a vehicle occupant of the host vehicle by projecting proximity graphic elements on a transparent surface of the host vehicle.

According to another aspect, a vehicle proximity system includes at least one sensor arranged on a host vehicle. The at least one sensor is configured to calculate proximity measurements of a proximal vehicle. The vehicle proximity system also includes a proximal vehicle module configured to calculate proximal vehicle data based on the proximity measurements of the proximal vehicle as the proximal vehicle approaches the host vehicle. The vehicle proximity system further includes a host vehicle module configured to compare the proximal vehicle data to host vehicle data to determine changes in relative motion data. The vehicle proximity system also includes a proximity alert module configured to control a heads-up display device to present the changes in the relative motion data as augmented reality proximity graphics in view of a vehicle occupant of the host vehicle by projecting proximity graphic elements on a transparent surface of the host vehicle. The vehicle proximity system includes a vehicle control module configured to control a cruise control system to adjust a cruise control setting of the host vehicle based on the changes in relative motion data.

According to yet another aspect, a vehicle proximity method includes calculating proximal vehicle data based on the proximity of a proximal vehicle to a host vehicle. The method also includes comparing the proximal vehicle data to host vehicle data of the host vehicle to determine relative motion data. The relative motion data includes a proximal distance between the host vehicle and the proximal vehicle. The method further includes controlling a heads-up display system to display the relative motion data as augmented reality proximity graphics in view of a vehicle occupant of the host vehicle by projecting proximity graphic elements on a transparent surface of the host vehicle through a heads-up display system. The method includes controlling a cruise control system to adjust a cruise control setting of the host vehicle based on the changes in relative motion data. The vehicle control module is configured to control the cruise control system to reduce the set speed of the host vehicle in response to a reduction in the proximal distance.

DETAILED DESCRIPTION

Figure 1:
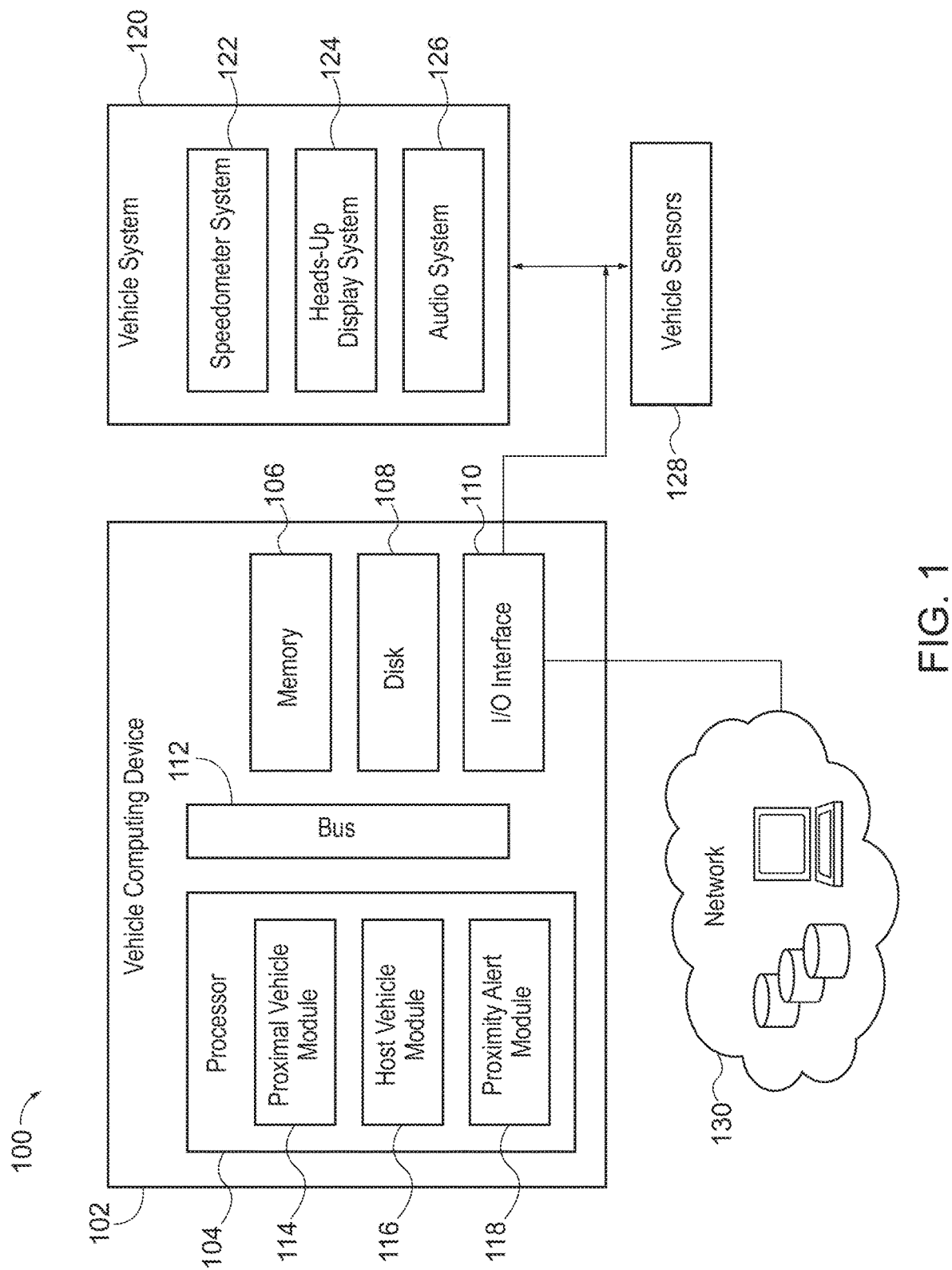
FIG. 1 is a block schematic illustrating a vehicle proximity system in communication with a vehicle control system.

Generally, the systems and methods disclosed herein are directed to a vehicle proximity system. The vehicle proximity system uses sensors, a vehicle computing device, and a heads-up display of a host vehicle to present proximity graphic elements to a vehicle occupant, such as the driver of the host vehicle. The proximity graphic elements are displayed using a heads-up display and are projected on a transparent surface of the host vehicle, such as the windows, windshield, display screen, lenses, etc. The proximity graphic elements indicate the presence of a proximal vehicle to the host vehicle. In some embodiments, the proximal vehicle is a vehicle passing the host vehicle. Alternatively, the proximal vehicle may be inline with the host vehicle traveling in a forward or rearward direction.

The proximity graphic elements may also indicate the relative motion of the proximal vehicle relative to the host vehicle. Suppose that the host vehicle is operating using cruise control and is separated from an anterior proximal vehicle by a proximal distance. The visual characteristics of the proximity graphic elements may change to indicate whether the host vehicle is gaining on the proximal vehicle (i.e., closing the proximal distance) or falling behind the proximal vehicle (i.e., enlarging the proximal distance). Further, the cruise control settings of the host vehicle, such as speed, may be altered to maintain a predetermined proximal distance. For example, the cruise control system may be controlled to reduce the set speed of the host vehicle in response to a reduction in the proximal distance.

In another embodiment, the proximal vehicle may be laterally adjacent the host vehicle, for example, in the event that the proximal vehicle is passing the host vehicle. The visual characteristics of the proximity graphic elements change to indicate whether the proximal vehicle is approaching or moving away from the host vehicle. For example, the graphic elements may include a plurality of bars that become increasingly larger and/or spaced increasingly close together as the proximal vehicle approaches the host vehicle.

Definitions

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication," as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk," as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database," as used herein can refer to table, a set of tables, a set of data stores and/or methods for accessing and/or manipulating those data stores. Some databases can be incorporated with a disk as defined above.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device," as used herein, is a computing device typically having a display screen with user input (e.g., touch, keyboard) and a processor for computing. Portable devices include, but are not limited to, handheld devices, mobile devices, smart phones, laptops, tablets, and e-readers. In some embodiments, a "portable device" could refer to a remote device that includes a processor for computing and/or a communication interface for receiving and transmitting data remotely.

A "vehicle," as used herein for both a host vehicle and proximal vehicle(s), refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PH EV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

A "vehicle occupant," as used herein can include, but is not limited to, one or more biological beings located in the vehicle. The vehicle occupant can be a driver or a passenger of the vehicle.

System Overview

Referring now to the drawings, wherein the showings are for purposes of illustrating one or more exemplary embodiments and not for purposes of limiting same, FIG. 1 is a schematic view of an operating environment 100 of a host vehicle for implementing systems and methods for detecting proximal vehicle proximity according to an exemplary embodiment. The components of the operating environment 100 of the host vehicle, as well as the components of other systems, hardware architectures, and software architectures discussed herein, may be combined, omitted, or organized into different architectures for various embodiments. Further, the components of the operating environment 100 can be implemented in with or remotely associated with the host vehicle.

In the illustrated embodiment of FIG. 1, the operating environment 100 includes a vehicle computing device (VCD) 102 with provisions for processing, communicating and interacting with various components of the host vehicle and other components of the operating environment 100. In one embodiment, the VCD 102 can be implemented with the host vehicle, for example, as part of a telematics unit, a head unit, a navigation unit, an infotainment unit, an electronic control unit, among others. In other embodiments, the components and functions of the VCD 102 can be implemented remotely from the host vehicle, for example, with a portable device (not shown) or another device connected via the network 130.

Generally, the VCD 102 includes a processor 104, a memory 106, a disk 108, and an input/output (I/O) interface 110, which are each operably connected for computer communication via a bus 112 and/or other wired and wireless technologies. The I/O interface 110 provides software and hardware to facilitate data input and output between the components of the VCD 102 and other components, networks, and/or data sources. Additionally, the processor 104 includes a proximal vehicle module 114, a host vehicle module 116, and a proximity alert module 118, that provide vehicle proximity detection and visual notification facilitated by the operating environment 100.

The VCD 102 is also operably connected for computer communication (e.g., via the bus 112 and/or the I/O interface 110) to one or more vehicle systems 120. The vehicle systems 120 can include, but are not limited to, any automatic or manual systems that can be used to enhance the vehicle, driving, and/or safety. Here, the vehicle systems 120 include a speedometer system 122, a head-up display system 124 that is described in more detail with respect to FIG. 2, and an audio system 126 according to an exemplary embodiment. The speedometer system 122 monitors the speed of the host vehicle including acceleration and deceleration. The heads-up display system 124 displays information, such as directions, data, and alerts as augmented reality proximity graphics in view of a vehicle occupant of the host vehicle by projecting proximity graphic elements on a transparent surface of the host vehicle. As described above, the transparent surface may include windshield, windows, display screen, lenses, such as glasses lenses of a vehicle occupant, among others. The audio system 126 controls audio (e.g., audio content, volume) in the host vehicle.

The vehicle systems 120 include and/or are operably connected for computer communication to various vehicle sensors 128. The vehicle sensors 128 provide and/or sense information associated with the host vehicle, the host vehicle environment, and/or the vehicle systems 120. It is understood that the vehicle sensors 128 can include, but are not limited to, the vehicle sensors 128 associated with the vehicle systems 120 and other vehicle sensors 128 associated with the host vehicle. Specific vehicle sensors 128 can include, but are not limited to, environmental sensors, vehicle speed sensors, accelerator pedal sensors, brake sensors, throttle position sensors, wheel sensors, anti-lock brake sensors, camshaft sensors, among others. Other vehicle sensors 128 can include, but are not limited to, cameras mounted to the interior or exterior of the vehicle and radar and laser sensors mounted to the exterior of the vehicle. Further, the vehicle sensors 128 can include sensors external to the vehicle (accessed, for example, via the network 130), for example, external cameras, radar and laser sensors on other vehicles in a vehicle-to-vehicle network, street cameras, surveillance cameras, among others.

The vehicle sensors 128 are operable to sense a measurement of data associated with the host vehicle, the proximal vehicle, the vehicle environment, the vehicle systems 120, and generate a data signal indicating said measurement of data. These data signals can be converted into other data formats (e.g., numerical) and/or used by the vehicle systems 120 and/or the VCD 102 to generate other data metrics and parameters. It is understood that the vehicle sensors 128 can be any type of sensor, for example, acoustic, electric, environmental, optical, imaging, light, pressure, force, thermal, temperature, proximity, among others.

The VCD 102 is also operatively connected for computer communication to the network 130. It is understood that the connection from the I/O interface 110 to the network 130 can be facilitated in various ways. For example, through a network connection (e.g., wired or wireless), a cellular data network from a portable device (not shown), a vehicle to vehicle ad-hoc network (not shown), an in-vehicle network (not shown), among others, or any combination of thereof. The network 130 serves as a communication medium to various remote devices (e.g., databases, web servers, remote servers, application servers, intermediary servers, client machines, other portable devices).

Application of Systems and Methods

Figure 2:
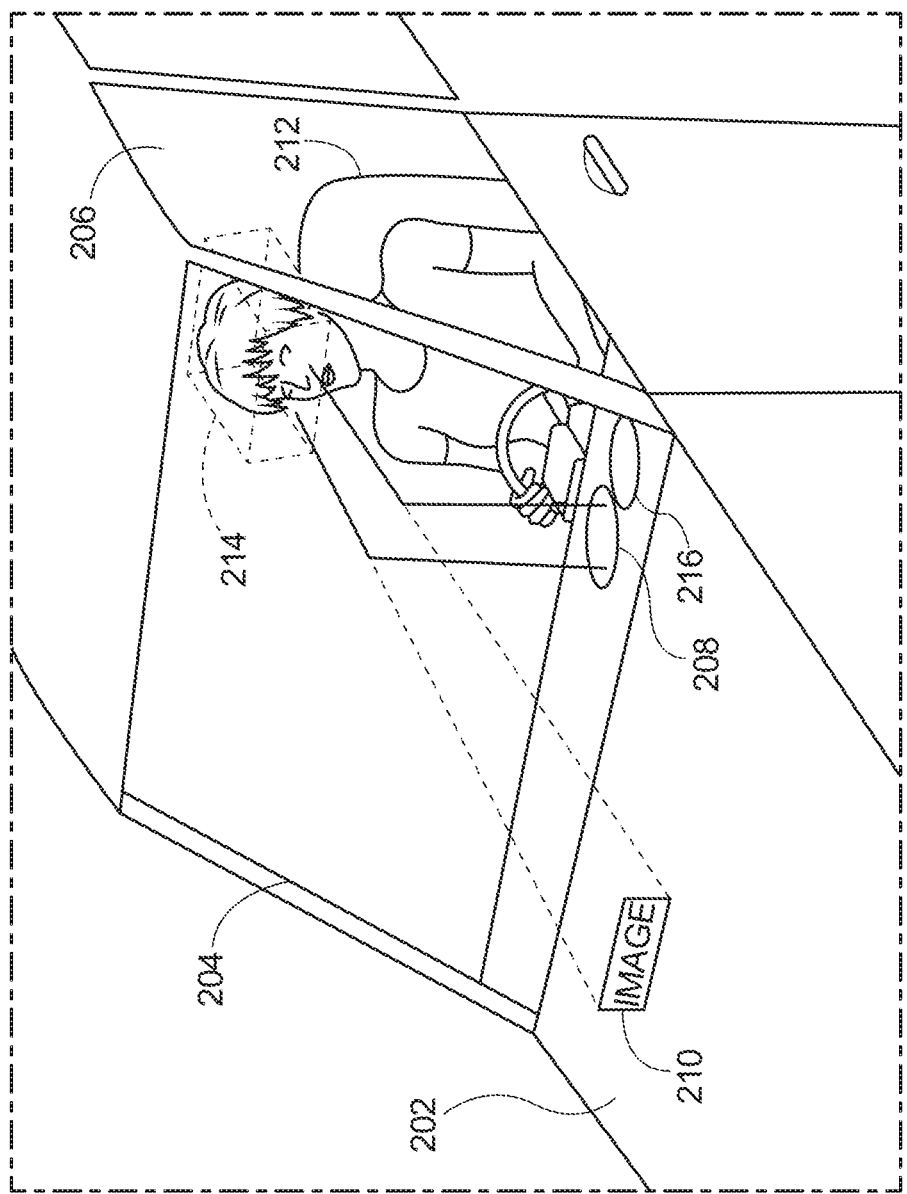
FIG. 2 is a schematic illustration of a vehicle having a heads-up display system.

The system shown in FIG. 1 will now be described in operation according to an exemplary embodiment referring to FIGS. 1, 2, and 3. It is understood that the illustrative examples discussed herein are exemplary in nature and that other vehicle proximity functions can be implemented. As mentioned above, and as shown in detail in FIGS. 3A, 3B, and 3C, the system includes a host vehicle (e.g., the host vehicle 300 of FIG. 3), with one or more vehicle systems 120 and one or more vehicle sensors 128. The host vehicle 300 also includes the processor 104 having a proximal vehicle module 114, a host vehicle module 116, and a proximity alert module 118. The proximal vehicle module 114 and the host vehicle module 116 use information from the vehicle systems 120 and the vehicle sensors 128 to determine the proximity of the proximal vehicle 302 to the host vehicle 300.

The vehicle systems 120 and/or the vehicle sensors 128 detect the proximal vehicle 302. For example, the vehicle sensors 128 may include a plurality of optical sensors (e.g., RADAR or LIDAR) placed around the host vehicle 300. When one or more of the optical sensors detects a proximal vehicle 302, the optical sensors of the vehicle sensors 128 record at least one proximity measurement. In some embodiments, the proximity measurements include a timestamp measurement, a proximal distance measurement, a proximal speed measurement, among others. The timestamp measurement may be a chronological reference indicating when the proximity measurements were taken. The proximal distance measures the distance between the host vehicle 300 and the proximal vehicle 302. In some embodiments, the vehicle systems 120 and/or the vehicle sensors 128 may measure the proximal speed which is the speed of the proximal vehicle 302.

The proximal vehicle module 114 receives the at least one proximity measurement from the vehicle systems 120 and/or the vehicle sensors 128. The proximal vehicle module 114 uses the proximity measurements to calculate proximal vehicle data. For example, when proximal speed is not measured by the vehicle systems 120 and/or the vehicle sensors 128, the proximal vehicle module 114 can calculate the proximal speed using the timestamp measurements and the proximal distances. Accordingly, the proximal vehicle module 114 may use two or more proximity measurements to calculate the proximal vehicle data. In another embodiment, the proximal vehicle module 114 aggregates the proximity measurements according to a metric. For example, the proximal vehicle module 114 may generate proximity vehicle data by aggregating the proximity measurements according to the timestamp measurements.

The host vehicle module 116 compares the proximal vehicle data to host vehicle data. The host vehicle data may be received from the vehicle systems 120 and/or the vehicle sensors 128. For example, the host vehicle data may be received from the speedometer system 122 as host speed measurements. The host vehicle data may also include timestamp measurements. In accordance with the example given above, the proximity vehicle data may be compared to the host vehicle data based on the metric, for example, the timestamp measurements. Accordingly, the time stamp measurements may be used as reference points from comparing the proximal vehicle data to the host vehicle data such that the proximal speed of the proximal vehicle 302 can be compared to the host speed of the host vehicle 300 at a given time. One or more comparisons are used to determine the relative motion data.

The relative motion data of the proximal vehicle 302 to the host vehicle 300 describes whether the proximal vehicle 302 is approaching the host vehicle 300 or moving away from the host vehicle 300. In particular, the relative motion data may include whether the proximal distance between the host vehicle 300 and the proximal vehicle 302 is reduced or enlarged. The proximity alert module 118 controls the heads-up display system 124 to present the relative motion data as augmented reality proximity graphics in view of a driver (not shown) of the host vehicle 300 by projecting proximity graphic elements 306.

The heads-up display system 124 may take the form of any such device capable of projecting the proximity graphic elements 306 determined by the host vehicle module as heads-up display augmented reality graphic elements, including contact-analog augmented reality graphic elements which are rendered to appear to the driver as being directly on the environment surrounding the vehicle. With reference to FIG. 2, the heads-up display system 124 may be provided in a dashboard heads-up display enclosure 202 of the vehicle, and configured to project the proximity graphic elements on a transparent surface, such as windshield 204 or window 206, of the host vehicle through a first heads-up display exit aperture 208 using a projector, such as a digital light processing (DLP) projector, liquid crystal on silicon (LCoS) projector, laser projector, light emitting diode (LED) projector, among others. The proximity graphic elements are rendered to the driver as augmented reality graphic elements appearing in the environment as image 210 when the driver is seated in a driver seat 212 and the driver's eyes are in an eye box 214.

In some embodiments, the proximity graphic elements are projected on the window 206 through a second heads-up display exit aperture 216. The second heads-up display exit aperture 216 may use the same projector as used to project the proximity graphic elements through the first heads-up display exit aperture 208. Alternatively, a second projector may be used independently of the first heads-up display exit aperture 208. Accordingly, multiple heads-up display exit apertures and/or multiple projectors may be used to project multiple sets of proximity graphic elements. For example, a first set of a proximity graphic elements may be projected on the windshield 204 from the first heads-up display exit aperture 208 and a second set of proximity graphic elements may be projected on the window 206 from the second heads-up display exit aperture 216. The first set of proximity graphic elements may be inline graphic elements that indicate that the proximal vehicle 302 moving in a forward or rearward direction with respect to the host vehicle 300. The second set of proximity graphic elements may be lateral graphic elements that indicate that the proximal vehicle 302 is laterally adjacent the host vehicle 300. The first set of proximity graphic elements and the second set of proximity graphic elements may be displayed concurrently or separately based on driver preference, number of proximal vehicles, and location of the proximal vehicle among other considerations.

Furthermore, the heads-up display system 124 may be configured to present the proximity graphic elements on a ground-surface focal plane, a sky focal plane, one or more frontal focal planes, and one or more peripheral focal planes. The ground-surface focal plane is parallel to and substantially on a ground surface. The sky focal plane is parallel to and above the ground surface (i.e., above the vehicle). The frontal focal plane is oriented perpendicularly to the ground surface. The peripheral focal plane is oriented perpendicularly to the ground surface off center of the viewer, such as in the peripheral vision of a driver. In some embodiments, the projecting means may be a virtual retinal display for projecting the proximity graphic elements directly onto the retina of the driver.

The proximal vehicle module 114 and the host vehicle module 116 continuously or iteratively (hereinafter referenced as being continuously) calculate proximal vehicle data and host vehicle data, respectively, so that the host vehicle module 116 can calculate the relative motion data continuously over a predetermined time period. The predetermined time period may include at least one of: a time period beginning at a most recent power-on of the vehicle and continuing to a current time; a time period beginning at a first power-on of the vehicle and continuing to the current time (i.e., a time period covering a life of the vehicle); a time period beginning at the vehicle sensors 128 detecting a proximal vehicle 302 and continuing until the proximal vehicle 302 is no longer detected by any of the vehicle sensors 128, and a time period beginning at a the vehicle sensors 128 detecting a proximal vehicle 302 in a distance range of the host vehicle 300 and continuing until the proximal vehicle 302 moves outside of the distance range. Likewise, the proximity alert module 118 controls the heads-up display system 124 to continuously present the relative motion data as augmented reality proximity graphics for the predetermined time period.

Figure 3A:
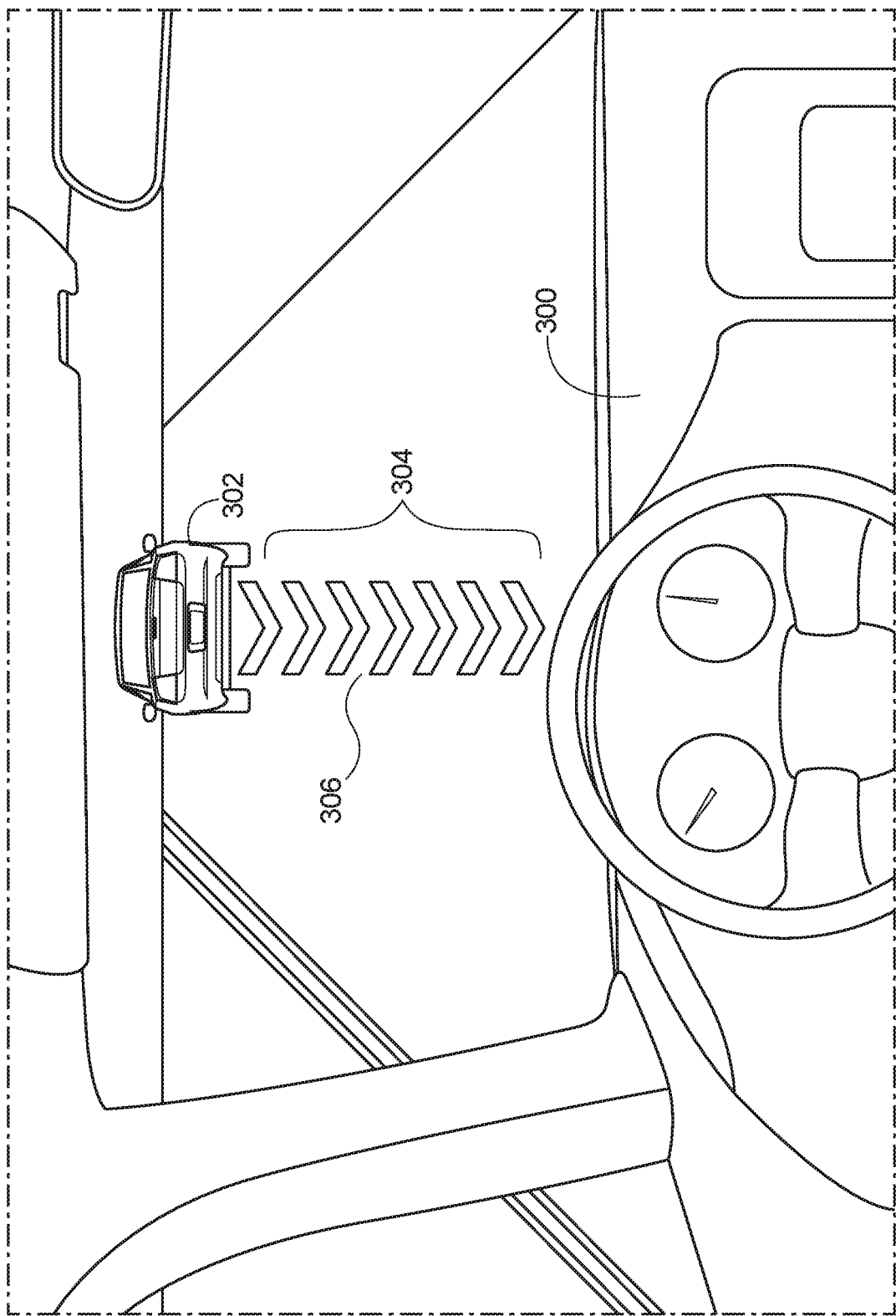
FIGS. 3A, 3B, and 3C illustrate a point of view of a driver looking through a windshield of a vehicle while proximity graphic elements are projected by a heads-up display system as inline graphic elements.
Figure 3B:
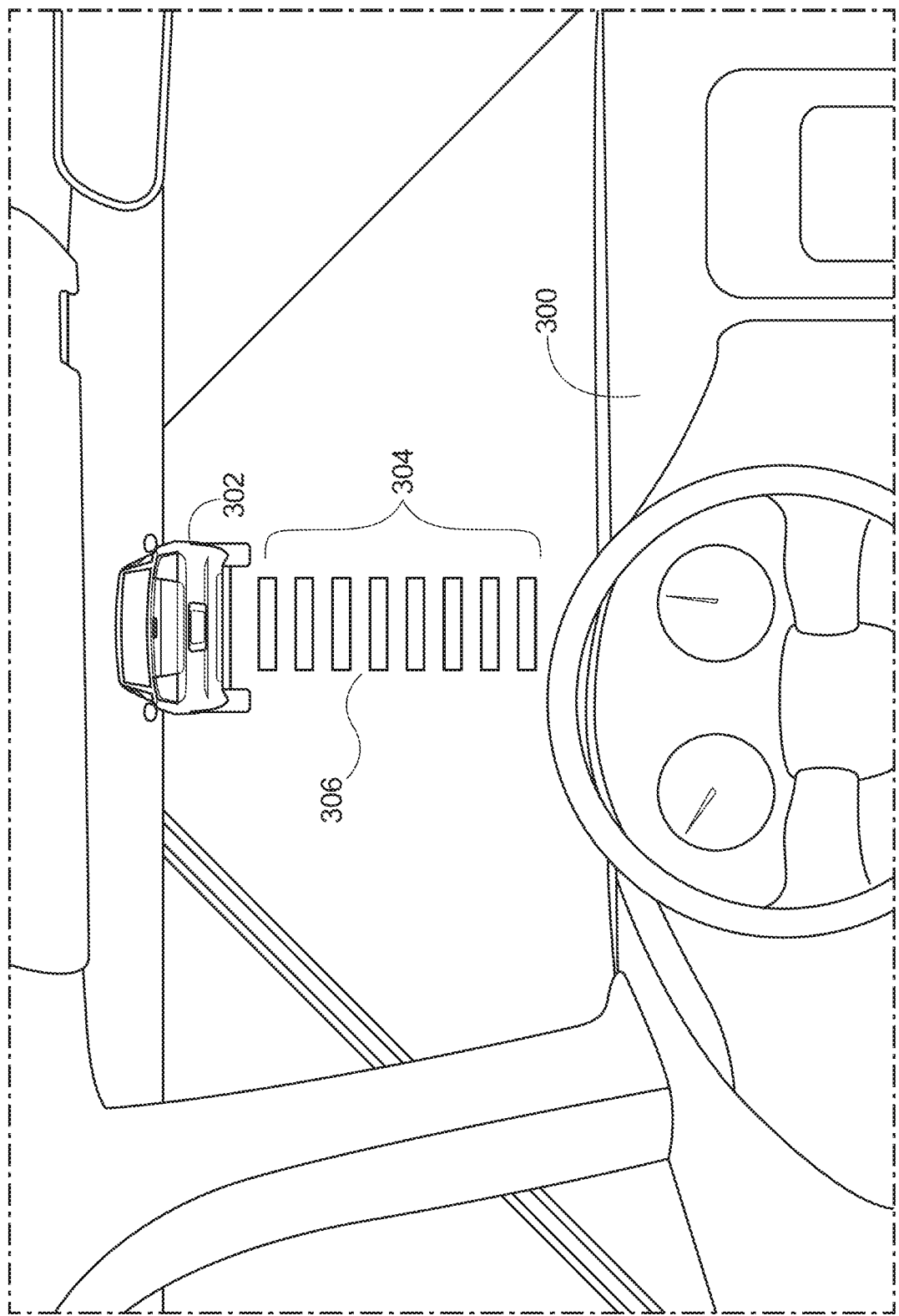
Figure 3C:
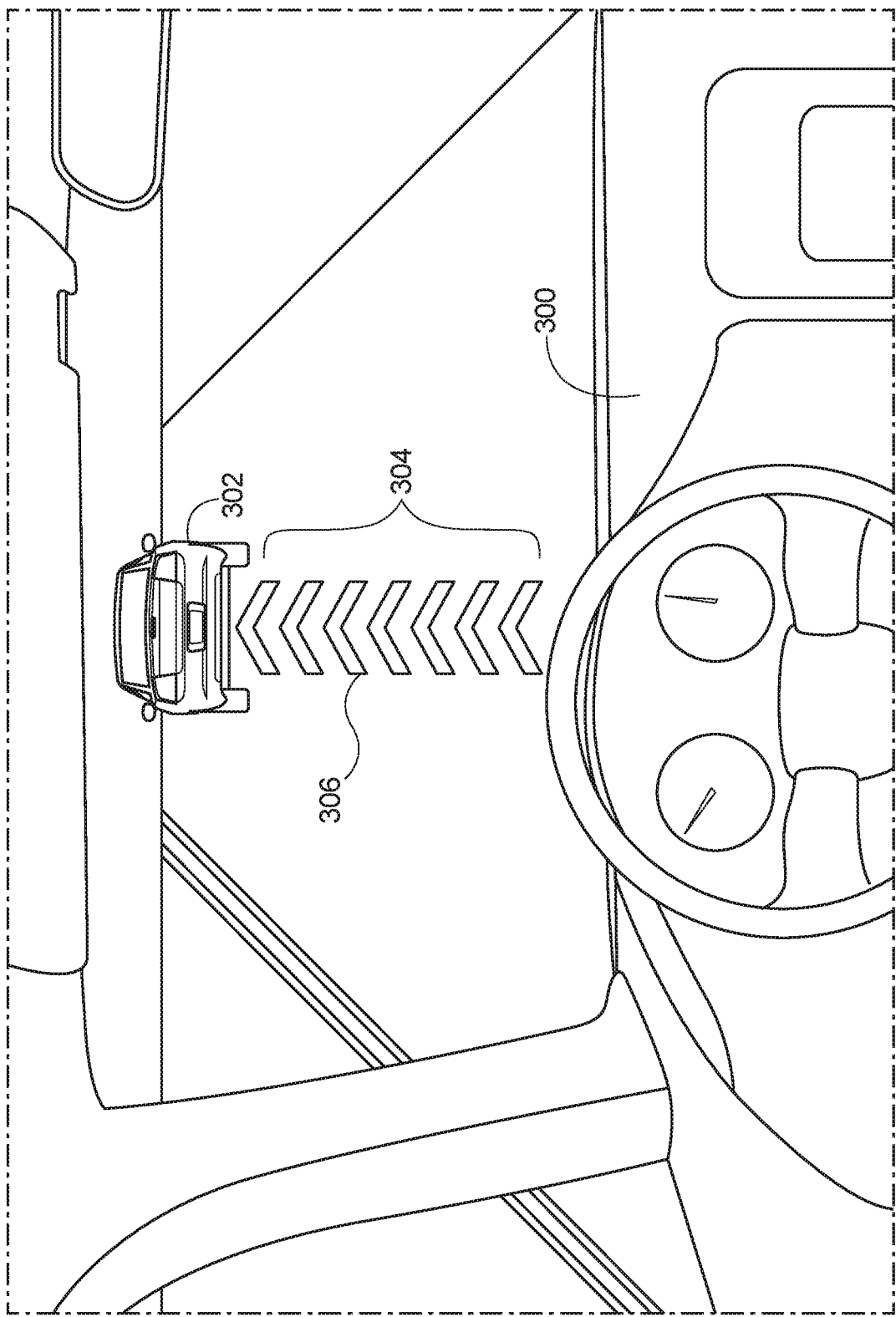

Referring to FIGS. 3A, 3B, and 3C, the proximity graphic elements distinguish between types of relative motion data by changing visual characteristics of the proximity graphic elements. For example, the visual characteristics of the proximity graphic elements include color, shape, spacing, and size. In FIG. 3A the relative motion data indicates that the proximal distance 304 between the host vehicle 300 and the proximal vehicle 302 is becoming smaller. The reduction in the proximal distance 304 may be due to the host vehicle 300 gaining on the proximal vehicle 302 or the proximal vehicle 302 slowing. To indicate that the proximal distance 304 is becoming smaller, the proximity graphic elements 306 are displayed for the driver (not shown).

The proximity graphic elements 306 may include shapes, like chevrons or triangles, having a point end and terminal ends, and wherein the direction of the point end indicates whether the proximal vehicle is approaching the host vehicle 300 or moving away from the host vehicle 300. In the example given in FIG. 3A, the proximity graphic elements 306 may have a point directed toward the host vehicle 300 to indicate that the proximal distance 304 is becoming smaller such that the proximal vehicle 302 is approaching the host vehicle 300. The color of the proximity graphic elements 306 may be used to indicate that the proximal distance 304 is becoming smaller as well. For example, when the proximal distance 304 is becoming smaller the proximity graphic elements 306 may be a cautionary color (e.g., red, orange, yellow, etc.).

Furthermore, the spacing of the proximity graphic elements 306 may become smaller or larger as the proximal distance 304 becomes smaller. For example, as the host vehicle 300 approaches the proximal vehicle 302, the proximity graphic elements 306 may also become closer to one another. In another embodiment, the size of the proximity graphic elements 306 may increase or decrease as the proximal distance 304 becomes smaller or larger.

In FIG. 3B the relative motion data indicates that the proximal distance 304 between the host vehicle 300 and the proximal vehicle 302 is constant. Here, rather than having a point, the shape of the proximity graphic elements 306 may have straight edges facing both the host vehicle 300 and the proximal vehicle 302 to indicate that the host vehicle 300 is neither gaining nor losing ground relative to the proximal vehicle 302. As discussed above, the color of the proximity graphic elements 306 may also be used to indicate the relative motion data. For example, a predetermined color, such as green, may be used to indicate that the driver should maintain the proximal distance 304 between the host vehicle 300 and the proximal vehicle 302.

In FIG. 3C the relative motion data indicates that the proximal distance 304 between the host vehicle 300 and the proximal vehicle 302 is becoming larger. Here, the shape of the proximity graphic elements 306 may be used to indicate that the proximal vehicle is moving further away from the host vehicle 300. Specifically, the point of the proximity graphic elements 306 is directed to the proximal vehicle 302. Additionally, the color of the proximity graphic elements 306 may be a non-cautionary color (e.g., blue, indigo, violet, etc.) to indicate that the proximal distance 304 is becoming larger.

In another embodiment, the proximity alert module 118 can control the audio system 126 to provide an audio alert in lieu of or to accompany the proximity graphic elements. For example, the proximity alert module 118 can play an alert or adjust the proximity graphic elements and/or volume of audio to alert the vehicle occupant of a change in the relative motion data. For example, the proximity alert module 118 can control the heads-up display system 124 to display the proximity graphic elements and additionally control the audio system 126 to provide an audio alert when the proximal distance is within a predetermined range in order to alert the vehicle occupant to a potential hazardous situation.

Figure 4:
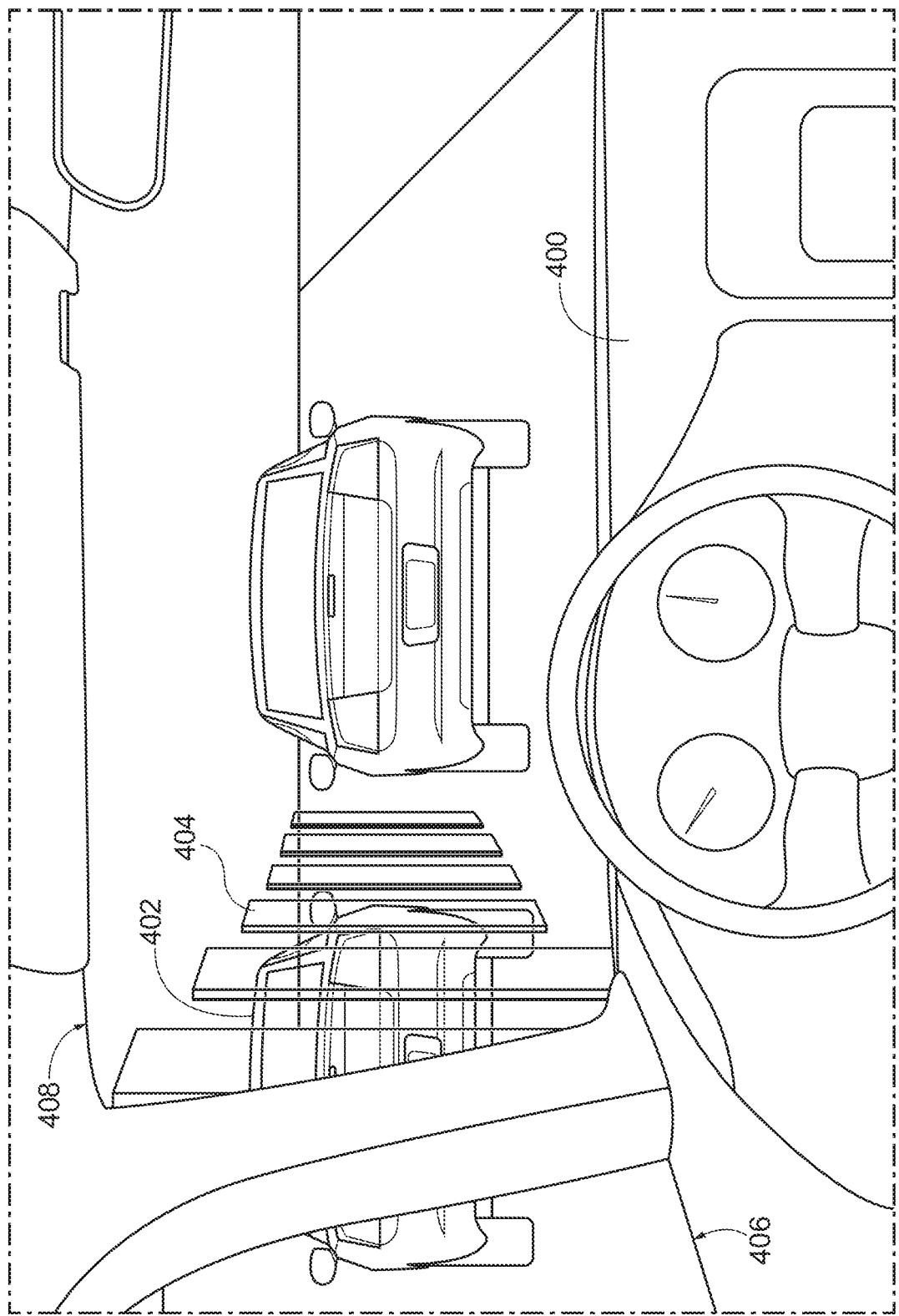
FIG. 4 illustrates a point of view of a driver looking through a windshield of a vehicle while proximity graphic elements are projected by a heads-up display system as lateral graphic elements.

The examples shown in FIGS. 3A, 3B, and 3C are example of proximity graphic elements 306 that are inline graphic elements because the inline graphic elements indicate that the proximal vehicle 302 moving in a forward or rearward direction with respect to the host vehicle 300. FIG. 4 illustrates an example of proximity graphic elements 306 that are lateral graphic elements because the graphic elements indicate that the proximal vehicle 302 is approaching the host vehicle 300 from a point that is off center of the host vehicle 300. For example, in FIG. 4 the proximal vehicle 302 is passing the host vehicle 300 in an adjacent lane.

Referring to FIG. 4, a host vehicle 400 is being passed on the left by a proximal vehicle 402. The proximity alert module 118 controls the head-up display system 124 to project proximity graphic elements 404. In this example, the proximity graphic elements are lateral graphic elements projected onto a driver's side window 406 of the host vehicle 400. Alternatively, the proximity graphic elements 404 may be projected on the windshield 408 of the host vehicle.

Like the proximity graphic elements 306 described above with respect to FIGS. 3A, 3B, and 3C, the proximity graphic elements 404 have visual characteristics that are changed to reflect changes in the relative motion data. For example, here the proximity graphic elements 404 are shown as a series of bars. The color of the bars may change as the proximal vehicle 402 approaches the host vehicle 400. For example, the bars may have a cautionary color that increases in intensity and/or hue as the proximal vehicle 402 approaches the host vehicle 400. Additionally or alternatively, the spacing of the bars may be increased or decreased as the proximal vehicle 402 approaches the host vehicle 400, such that the bars appear closer as the proximal vehicle 402 becomes closer to the host vehicle. The bars may appear increasingly separated as the proximal distance between the proximal vehicle 402 and the host vehicle increases.

Figure 5:
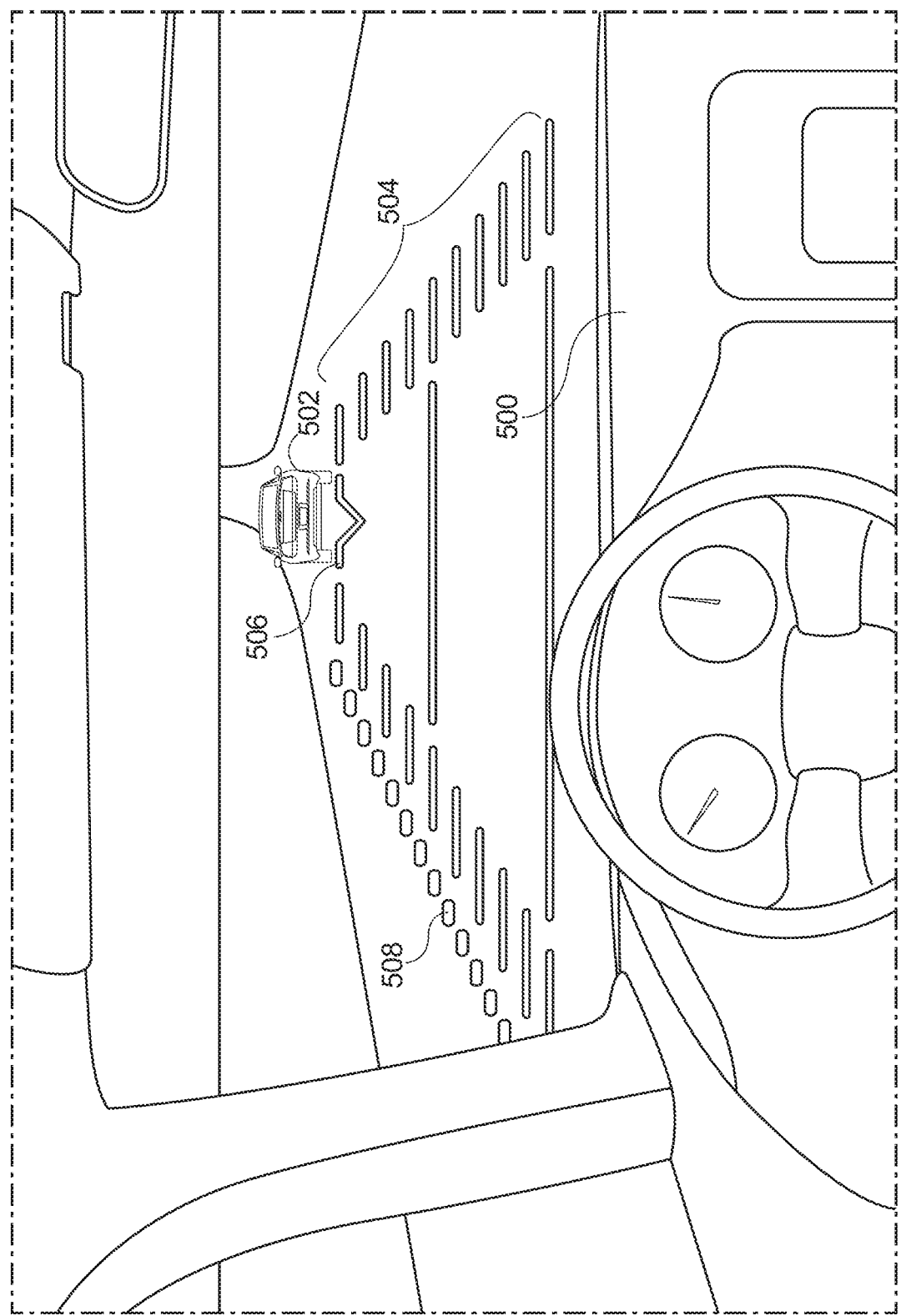
FIG. 5 illustrates a point of view of a driver looking through a windshield of a vehicle while proximity graphic elements are projected by a heads-up display system as spacing markers.

FIG. 5 illustrates a point of view of a driver looking through a windshield of a vehicle while proximity graphic elements are projected by a heads-up display system as distance markers. Suppose that the host vehicle 500 is following a proximal vehicle 502 by a proximal distance denoted by proximity graphic elements 504 that are distance markers. The distance markers may illustrate a vehicle length and fractional measurements thereof to give a vehicle occupant a sense of depth to allow the vehicle occupant to better gauge the distance between the host vehicle 500 and the proximal vehicle 502.

Figure 6:
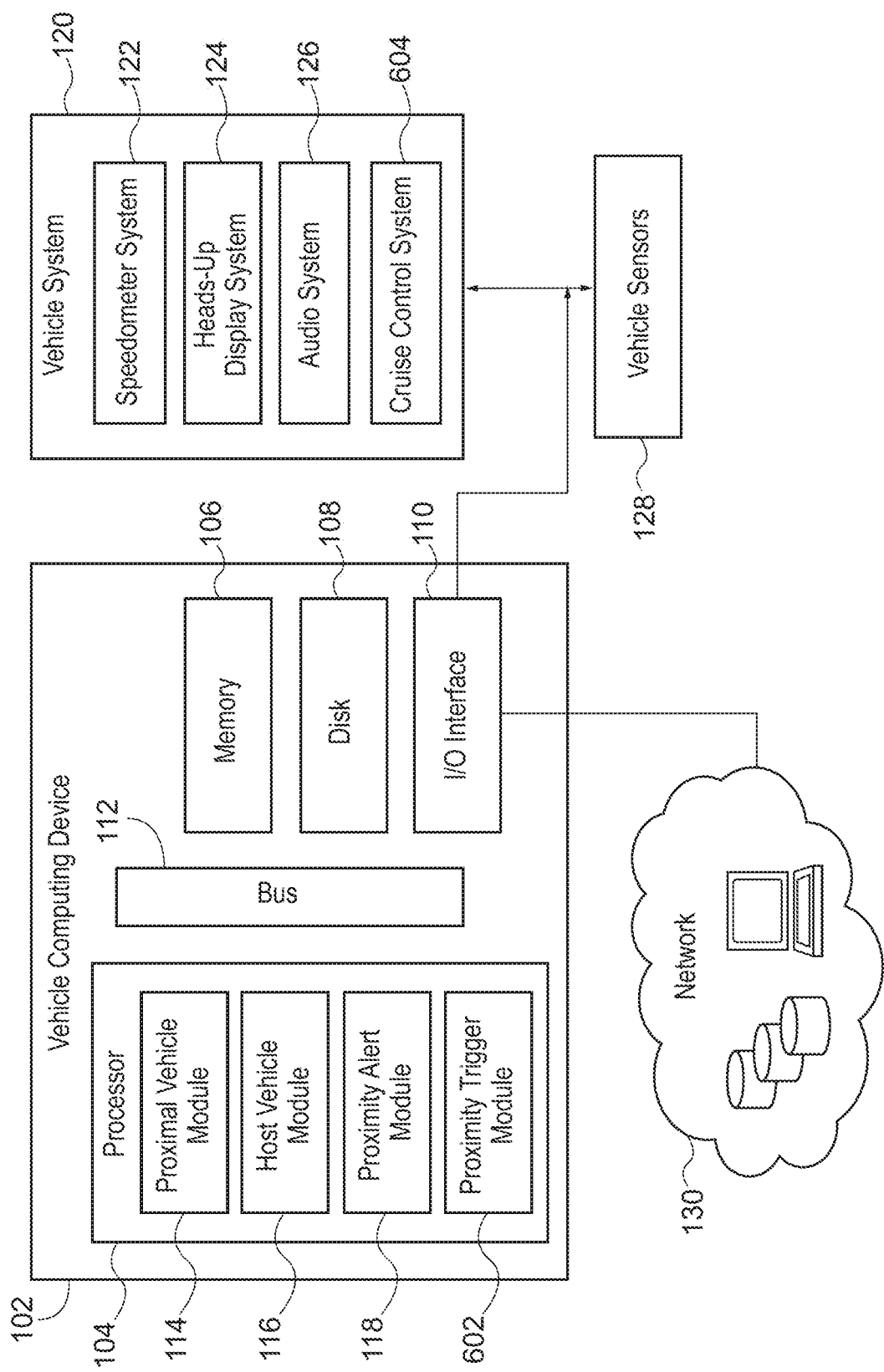
FIG. 6 is a block schematic illustrating a vehicle proximity system having a trigger module in communication with a vehicle control system having a cruise control system.

FIG. 6 is a block schematic illustrating a vehicle proximity system having similar components as those described with respect to FIG. 1. The components of FIG. 6 previously described above with respect to FIG. 1 operate in a similar manner as described with respect to FIG. 1. FIG. 6 additionally includes a proximity trigger module 602 of the processor 104 and a cruise control system 604 of the vehicle systems 120.

The proximity trigger module 602 receives the proximity measurements from the vehicle systems 120 and/or the vehicle sensors 128 and determines whether the proximal vehicle 302 is a threshold distance from the host vehicle 300.

When the distance threshold is met such that the proximal vehicle 302 is within a proximal distance 304 equal to or less than the threshold distance, the proximity trigger module 602 triggers the proximal vehicle module 114 by providing the proximity measurements. Accordingly, the proximity trigger module 602 acts a gatekeeper to keep the proximal vehicle module 114 from becoming overwhelmed with data.

As described above, the relative motion data may be calculated continuously. Accordingly, the proximity trigger module 602 is further configured to continuously provide the proximity measurements to the proximal vehicle module 114 while the proximal vehicle is within the distance threshold of the host vehicle 300 so that the relative motion data can be continuously calculated so that proximity graphic elements are based on the most current relative motion data.

In addition to controlling the heads-up display system 124, the proximity alert module 118 may also control the cruise control system 604. Suppose that the cruise control system 604 is set so that the host vehicle 300 maintains a speed of 60 miles per hour (mph). When the relative motion data indicates that the proximal distance is decreasing and the host vehicle 300 is approaching an anterior proximal vehicle 302, the proximity alert module 118 controls the cruise control system 604 to reduce the set speed of the host vehicle 300 in response to the reduction in the proximal distance. The reduction in set speed may be based on the proximal vehicle data such that the set speed is set to the calculated speed of the proximal vehicle 302. Alternatively, the set speed may be reduced by a predetermined amount.

Figure 7:
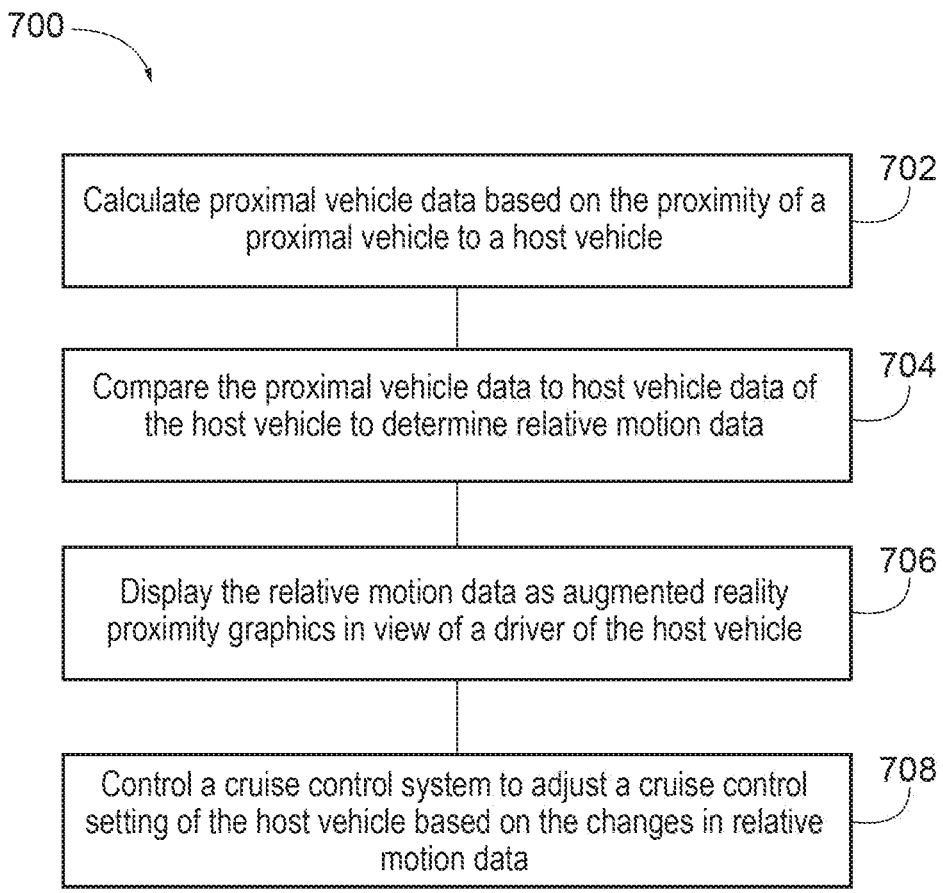
FIG. 7 is a flowchart for a vehicle proximity method associated with the vehicle proximity system.

Referring now to FIG. 7, a method 700 for detecting vehicle proximity according to an exemplary embodiment will be described. FIG. 7 will be described with reference to the components of FIGS. 1, 2, 3A, 3B, and 3C. Additionally, FIG. 7 will be described with illustrative examples referring to FIGS. 4, 5, and 6. It is understood that the illustrative examples discussed herein are exemplary in nature and that other vehicle occupants, additional proximal vehicles, and vehicle control functions can be implemented.

With references to FIG. 7, at block 702, the method 700 includes calculating proximal vehicle data based on the proximity of a proximal vehicle 302 to a host vehicle 300. In some embodiments, a proximity trigger module 602 monitors a proximal vehicle 302 until the proximal vehicle 302 is within a predetermined range of the host vehicle 300. For example, the proximal vehicle 302 may be within a range of proximal distances to the host vehicle 300 such that proximity trigger module 602 provides proximity measurements to the proximal vehicle module 114 to trigger the proximal vehicle module 114 to calculate the proximal vehicle data for the proximal vehicle 302 is calculated. The proximity trigger module 602 may cease providing proximity measurements to the proximal vehicle module 114 when the proximal vehicle leaves the range of proximal distances.

At block 704, the method 700 includes comparing the proximal vehicle data to host vehicle data of the host vehicle to determine relative motion data. The host vehicle data may be pulled from vehicle systems 120, such as the speedometer system 122. Like the proximal vehicle data, the host vehicle data may be continuously updated. The comparison results in relative motion data. The relative motion data changes from a first time to a second time. Therefore, even when the proximal distance 304 between the host vehicle 300 and the proximal vehicle 302 is maintained, the relative motion data may change to reflect a past measurement to a current measurement. Accordingly, the relative motion data may be continuously updated to provide current relative motion data.

At block 706, the method 700 includes controlling a heads-up display system 124 to display the relative motion data as augmented reality proximity graphics in view of a vehicle occupant, such as a driver (not shown), of the host vehicle 300 by projecting proximity graphic elements 306 on a transparent surface of the host vehicle 300. In some embodiments, the current relative motion data may be indicated by presenting updates proximity graphic elements while older proximity graphic elements are scrolled into the background such that the current proximity graphic elements appear closer to the vehicle occupant than older proximity graphic elements.

At block 708, the method 700 includes controlling a cruise control system 604 to adjust a cruise control setting of the host vehicle 300 based on the changes in relative motion data. For example, the cruise control setting may a speed setting that is reduced in response to a reduction in the proximal distance 304. For example, as described above, the proximity alert module 118 may cause the cruise control system 604 to reduce the speed of the host vehicle 300 when a proximal vehicle crosses a threshold distance. The proximity alert module 118 may alter a cruise control setting when the proximal vehicle is within one host vehicle length of the host vehicle 300.

In this manner, the proximity system uses the proximal vehicle module 114, the host vehicle module 116, and the proximity alert module 118 to alert vehicle occupants to the presence of at least one proximal vehicle 302. The alert can include proximity graphic elements 306, audio alerts from the audio system 126, and/or changes to cruise control settings of the cruise control system 604. The alerts facilitate vehicle occupants gauging the proximal distance 304 from the host vehicle 300 to the proximal vehicle 302 to improve driving safety.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A vehicle proximity system, comprising:
   at least one sensor arranged on a host vehicle, wherein the at least one sensor is configured to calculate proximity measurements of a proximal vehicle; and
   a memory storing instructions when executed by a processor cause the processor to:
   determine if the proximal vehicle is a threshold distance from the host vehicle, and when the threshold distance is met, triggering proximal vehicle data by providing the proximity measurements;
   calculate the proximal vehicle data based on the proximity measurements of the proximal vehicle;
   compare the proximal vehicle data to host vehicle data to determine relative motion data; and
   control a heads-up display system to present the relative motion data as augmented reality proximity graphics in view of a vehicle occupant of the host vehicle by projecting proximity graphic elements on a transparent surface of the host vehicle, wherein the augmented reality proximity graphics include lateral graphic elements which indicate that the proximal vehicle is laterally adjacent the host vehicle, and wherein the lateral graphic elements include a plurality of bars that become increasingly larger and spaced increasingly closer together as the proximal vehicle is increasingly laterally adjacent the host vehicle.

2. The vehicle proximity system of claim 1, wherein the memory further stores instructions that when executed by the processor cause the processor to:
continuously provide the proximity measurements while the proximal vehicle is within the threshold distance of the host vehicle;
update the proximal vehicle data based on the continuously provided proximity measurements;
compare the updated proximal vehicle data to updated host vehicle data to determine current relative motion data; and
wherein the proximity graphic elements change based on the current relative motion data.

3. The vehicle proximity system of claim 1, wherein the heads-up display system is configured to project proximity graphic elements on a window of the host vehicle.

4. The vehicle proximity system of claim 1, wherein the proximity graphic elements include inline graphic elements which indicate that the proximal vehicle is moving in a forward or rearward direction with respect to the host vehicle.

5. The vehicle proximity system of claim 4, wherein the inline graphic elements include chevrons having a point end and terminal ends, and wherein the direction of the point end indicates whether the proximal vehicle is approaching the host vehicle or moving away from the host vehicle.

6. The vehicle proximity system of claim 1, wherein the heads-up display system has a first projector configured to project the proximity graphic elements on a windshield and a second projector configured to project proximity graphic elements on a window of the host vehicle.

7. The vehicle proximity system of claim 6, wherein the first projector and the second projector project proximity graphic elements simultaneously.

8. The vehicle proximity system of claim 1, wherein visual characteristics of the proximity graphic elements are changed to visually indicate changes in the relative motion data.

9. The vehicle proximity system of claim 8, wherein the visual characteristics include two or more of color, shape, spacing, and size.

10. The vehicle proximity system of claim 1, wherein the at least one sensor is further configured to calculate additional proximity measurements of one or more additional proximal vehicles.

11. A vehicle proximity system, comprising:
at least one sensor arranged on a host vehicle, wherein the at least one sensor is configured to calculate proximity measurements of a proximal vehicle; and
a memory storing instructions when executed by a processor cause the processor to:
determine if the proximal vehicle is a threshold distance from the host vehicle, and when the threshold distance is met, triggering proximal vehicle data by providing the proximity measurements;
calculate proximal vehicle data based on the proximity measurements of the proximal vehicle as the proximal vehicle approaches the host vehicle;
compare the proximal vehicle data to host vehicle data to determine changes in relative motion data;
control a heads-up display system to present a heads-up display device configured to present the changes in the relative motion data as augmented reality proximity graphics in view of a vehicle occupant of the host vehicle by projecting proximity graphic elements on a transparent surface of the host vehicle, wherein the augmented reality proximity graphics include lateral graphic elements which indicate that the proximal vehicle is laterally adjacent the host vehicle, and wherein the lateral graphic elements include a plurality of bars that become increasingly larger and spaced increasingly closer together as the proximal vehicle is increasingly laterally adjacent the host vehicle; and
control a cruise control system to adjust a cruise control setting of the host vehicle based on the changes in relative motion data.

12. The vehicle proximity system of claim 11, wherein the relative motion data includes a proximal distance between the host vehicle and the proximal vehicle, wherein the cruise control setting is a set speed of the host vehicle, and wherein the memory further stores instructions that when executed by the processor cause the processor to control the cruise control system to reduce the set speed of the host vehicle in response to a reduction in the proximal distance.

13. The vehicle proximity system of claim 11, wherein the memory further stores instructions that when executed by the processor cause the processor to cause an audio system of the host vehicle to provide a notification indicating proximity of the proximal vehicle.

14. The vehicle proximity system of claim 11, wherein the proximity graphic elements include inline graphic elements indicate that the proximal vehicle is moving in a forward or rearward direction with respect to the host vehicle.

15. A vehicle proximity method, comprising:
calculating proximal vehicle data based proximity measurements when a threshold distance is met;
comparing the proximal vehicle data to host vehicle data of the host vehicle to determine relative motion data, wherein the relative motion data includes a proximal distance between the host vehicle and the proximal vehicle;
controlling a heads-up display system to display the relative motion data as augmented reality proximity graphics in view of a vehicle occupant of the host vehicle by projecting proximity graphic elements on a transparent surface of the host vehicle, wherein the augmented reality proximity graphics include lateral graphic elements which indicate that the proximal vehicle is laterally adjacent the host vehicle, and wherein the lateral graphic elements include a plurality of bars that become increasingly larger and spaced increasingly closer together as the proximal vehicle is increasingly laterally adjacent the host vehicle; and
controlling a cruise control system to adjust a cruise control setting of the host vehicle, wherein the cruise control setting is a speed setting, and the speed setting is reduced in response to a reduction in the proximal distance.

16. The vehicle proximity method of claim 15, wherein the proximity graphic elements include inline graphic elements indicate that the proximal vehicle is moving in a forward or rearward direction with respect to the host vehicle.

* * * * *